United States Patent
Lagardere et al.

(10) Patent No.: US 7,676,092 B2
(45) Date of Patent: Mar. 9, 2010

(54) DATA INPUT APPARATUS AND METHOD

(75) Inventors: Xavier Lagardere, Barcelona (ES); Jose Antonio Magana, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 915 days.

(21) Appl. No.: 11/481,186

(22) Filed: Jul. 6, 2006

(65) Prior Publication Data
US 2007/0022370 A1    Jan. 25, 2007

(30) Foreign Application Priority Data
Jul. 7, 2005    (GB) .................................. 0513800.3

(51) Int. Cl.
*G06K 9/54* (2006.01)
*G10L 21/00* (2006.01)

(52) U.S. Cl. ........................ 382/187; 382/305; 704/275

(58) Field of Classification Search .................. 382/119, 382/115, 186, 176, 170, 232, 187, 189, 305, 382/309, 180; 705/12, 75, 2, 76; 707/E17.022, 707/E17.026, E17.031, E17.023; 379/88.26, 379/68, 69, 88.25; 434/161, 165; 713/176, 713/186; 340/5.83, 5.86; 235/51; 704/275
See application file for complete search history.

(56) References Cited

U.S. PATENT DOCUMENTS

| | | | |
|---|---|---|---|
| 5,581,783 A | | 12/1996 | Ohashi |
| 6,047,257 A | * | 4/2000 | Dewaele ..................... 704/270 |
| 6,285,785 B1 | * | 9/2001 | Bellegarda et al. .......... 382/187 |
| 6,539,113 B1 | * | 3/2003 | Van Kleeck ................. 382/185 |
| 6,961,446 B2 | * | 11/2005 | Imagawa et al. ............ 382/103 |
| 7,319,957 B2 | * | 1/2008 | Robinson et al. ............ 704/252 |
| 7,515,770 B2 | * | 4/2009 | Fukada ....................... 382/284 |
| 2003/0046063 A1 | | 3/2003 | Kim |
| 2004/0071344 A1 | | 4/2004 | Lui et al. |

FOREIGN PATENT DOCUMENTS

| | | |
|---|---|---|
| DE | 101 30 510 | 2/2002 |
| WO | 2005/010634 | 2/2005 |

* cited by examiner

*Primary Examiner*—Sheela C Chawan

(57) ABSTRACT

An apparatus is disclosed for providing data into a template document, the template document having a number of portions for completion by a user. The apparatus comprises: a verbal input device (72) arranged to receive and record a verbal passage, the verbal passage including information for a specific one of the portions of the template document; and a handwriting input device (70) arranged to decode handwritten information corresponding to the verbal passage, the handwritten information including identification of the specific portion of the template document. The apparatus also includes a data processing and storage device (78,82) arranged to: associate the verbal passage with the handwritten information based on the timings of the verbal passage and the handwritten information; determine from the verbal passage and the handwritten information the data to be provided into the specific portion of the template document; and associate the data with the specific portion of the template document.

16 Claims, 4 Drawing Sheets

DATA INPUT APPARATUS AND METHOD

CROSS-REFERENCE TO RELATED APPLICATIONS

The present application is based on, and claims priority from, United Kingdom Patent Application Number 0513800.3, of the same title and filed on Jul. 7, 2005, the disclosure of which is hereby incorporated by reference herein in its entirety.

FIELD OF THE INVENTION

This invention relates to an apparatus and method for providing data into a template document having a number of portions for completion by a user. Such documents may typically be forms.

BACKGROUND OF THE INVENTION

It is well known to use template documents, or forms, to record information provided during interviews.

For example, a user may conduct an interview for marketing purposes. During the interview, the user asks the interviewee a number of verbal questions and the interviewee provides verbal answers in response to the questions. The template document is used by the user to record the interviewee's answers in handwritten form, and contains a number of separate portions in which different answers can be recorded.

The template document is usually provided on a physical substrate, such as a piece of paper. Where a paper substrate is used, the information recorded in the template document frequently has to be transferred into an electronic version of the template document, so that the information may be conveniently stored and manipulated. The process of transferring the handwritten information into an electronic version of the template document is a process known as data entry.

The data entry process may involve a human operator reading the information recorded on the paper substrate and manually entering it into a computer system. Alternatively, the data entry process may involve computer based handwriting recognition techniques for recognising the information recorded on the paper substrate.

There are a number of potential issues associated with the use of template documents provided on paper substrates, as described above. Firstly, a user sometimes interprets the verbal answers provided by the interviewee incorrectly. This can result in the handwritten answers recorded in the template document being incorrect.

Secondly, depending on the speed and length of an interviewee's answers, the user may find it difficult to record all of the necessary information in legible handwritten form.

A further issue relates to the data entry process. The handwritten information recorded on the substrate is often difficult to read, either by a human operator or by handwriting recognition algorithms. Accordingly, the data that is entered into the electronic version of the template document often contains errors and/or omissions.

SUMMARY OF THE INVENTION

According to a first aspect of the present invention there is provided an apparatus for providing data into a template document having a number of portions for completion by a user, the apparatus comprising: a verbal input device arranged to receive and record a verbal passage, the verbal passage including information for a specific one of the portions of the template document; a handwriting input device arranged to both detect handwritten information corresponding to the verbal passage and identify the specific portion of the template document; and a data processing and storage device arranged to: associate the verbal passage with the handwritten information based on the timings of the verbal passage and the handwritten information; determine from the verbal passage and the handwritten information the data to be provided into the specific portion of the template document; and associate the data with the specific portion of the template document.

The invention employs a verbal input device and a handwriting input device that are capable of detecting not only a verbal passage and handwritten information relating to a specific portion of a template document, but also the timings of the verbal passage and the handwritten information. Additionally, the handwriting input device is capable of detecting the identity of the specific portion of the template document.

The invention thus provides an apparatus that uses verbal and handwritten information to determine the data to be entered into the specific portion of a template document. By using the two different types of information (verbal and written) the accuracy of the data entered into the electronic version of the template document is increased compared to using only handwritten information.

In an example, the handwriting input device comprises a pen-shaped reading device capable of providing the handwritten information as location and time (x, y, t) vectors, representing a two dimensional position on a substrate and time. The reading device can be for use with a substrate carrying a background pattern, local portions of the background pattern uniquely encoding respective locations of the substrate. The reading device is then arranged to read a local portion of the background pattern and decode a respective location of the substrate. A physical representation of the template document is recorded on the substrate, so that specific portions of the template document can be identified using the reading device. By continuously decoding locations of the substrate read by the reading device, hand strokes defining handwritten information may be decoded.

In an example, the reading device is also capable of making marks on the substrate. The reading device may be a conventional "digital pen" employed in so-called "digital pen and paper" technology.

The handwriting input device may alternatively be a known tablet device, or any other device capable of providing the necessary functionality.

The verbal input device may be a video input device and/or a voice input device. Where a voice input device is employed, this may be integrated with the handwriting input device in a single casing.

According to a second aspect of the invention, there is provided a method for providing data into a template document having a number of portions for completion by a user, the method comprising: receiving and recording a verbal passage, the verbal passage including information for a specific one of the portions of the template document; detecting handwritten information corresponding to the verbal passage and identifying the specific portion of the template document; associating the verbal passage with the handwritten information based on the timings of the verbal passage and the handwritten information; determining from the verbal passage and the handwritten information the data to be provided into the specific portion of the template document; and associating the data with the specific portion of the template document.

The method is performed by the above described apparatus when it is used to provide data into a template document.

The step of associating the verbal passage with the handwritten information provides synchronisation of the verbal passage and the handwritten information for a specific portion of the template document. These inputs are not previously synchronised, and have a timing relationship that may vary.

The step of determining the data to be provided into the specific portion of the template document may comprise: determining a part of the verbal passage that contains the information for the specific portion of the template document and recognising that part of the verbal passage by identifying words or phrases; recognising the handwritten information corresponding to the verbal passage by recognising text or graphics; and determining the data to be provided into the specific portion of the template document based on the recognised part of the verbal passage and the recognised handwritten information.

A number of techniques may be used to determine the relevant part of the verbal passage. For example, the relevant part of the verbal passage may be determined using a lead time for the user, the lead time being based on an average time between an answer provided by an interviewee in the spoken passage and an initial timing of the handwritten information for the specific portion of the template document.

Alternatively, or additionally, the relevant part of the verbal passage may be determined by disregarding a non-relevant part of the verbal passage, for example the part that represents a question asked by the user.

The relevant part of the verbal passage may also be determined based on a voice profile of the user, the voice profile being predetermined. For example, certain frequencies may be filtered based on a frequency profile of the user's voice.

The relevant part of the verbal passage may also be determined based on repetition of recognised words or phrases where, for example, the user repeats the answers provided by an interviewee.

The step of determining the data to be provided into the specific portion of the template document can comprise determining confidence scores for the recognised part of the verbal passage and the recognised handwritten information. Such a confidence scoring technique may be used to resolve conflicts between the recognised part of the verbal passage and the recognised handwritten information. The confidence scoring technique may involve assigning confidence scores to a plurality of alternative matches identified in each of the verbal and written recognition processes.

The invention also provides a computer program comprising computer program code means adapted to perform the above method when said program is run on a computer.

According to a third aspect of the invention, there is provided a method for providing data into a template document having a number of portions for completion by a user, the method comprising: providing a verbal passage, the verbal passage including information for a specific one of the portions of the template document; and providing handwritten information corresponding to the verbal passage, the handwritten information being positioned to identify the specific portion of the template document, wherein the verbal passage and the handwritten information are supplied to a data processing and storage device which: associates the verbal passage with the handwritten information based on the timings of the verbal passage and the handwritten information; determines from the verbal passage and the handwritten information the data to be provided into the specific portion of the template document; and associates the data with the specific portion of the template document.

This method is performed by a user of the above described apparatus when it is used to providing data into a template document.

BRIEF DESCRIPTION OF THE DRAWINGS

An example of the invention will now be described in detail with reference to the accompanying drawings, in which.

DETAILED DESCRIPTION

The invention provides an apparatus and method for providing data into an electronic template document having a number of portions for completion by a user. The invention uses both verbal and handwriting inputs for determining the data, thereby providing improved accuracy when compared to a system using only one type of input.

The verbal input may be provided by a microphone and/or a video camera in combination with an analogue to digital converter.

The handwriting input may be provided by any means that is capable of detecting a handwriting input in electronic form, and also capable of detecting the timing of the handwriting input and a location of the handwritten input on a substrate. One such means that is considered particularly suitable for the handwriting input means is known as "digital pen and paper" technology, and the example described herein employs such technology.

Before describing the invention in detail, an overview will be given of the digital pen and paper technology.

The substrate used in digital pen and paper technology is typically paper carrying a non-uniform background pattern of dots. The pattern of dots at any location encodes location information for the location on the page. An overlying image may be provided as a watermark so that the dots of the background pattern can be distinguished. The local dot pattern on all locations of the background pattern is unique and identifies the location. The number of different possible local dot patterns is preferably sufficiently large that a large number of different pages can be provided with different background patterns, with different local dot patterns at all locations for all pages. Thus, any local dot pattern can identify not only a position on the page, but can also identify a page of a multiple page document or one document from several documents.

The digital pen and paper technology thus provides a means of digitising handwritten text and drawings at the same time that the information is being written on the physical paper substrate. This provides immediate digital information for further handling and processing.

For example, the technology may be used for creating a data file providing information which has been handwritten on a paper substrate. An example of this known use of the technology will first be described, to explain the technology.

Figure 1:
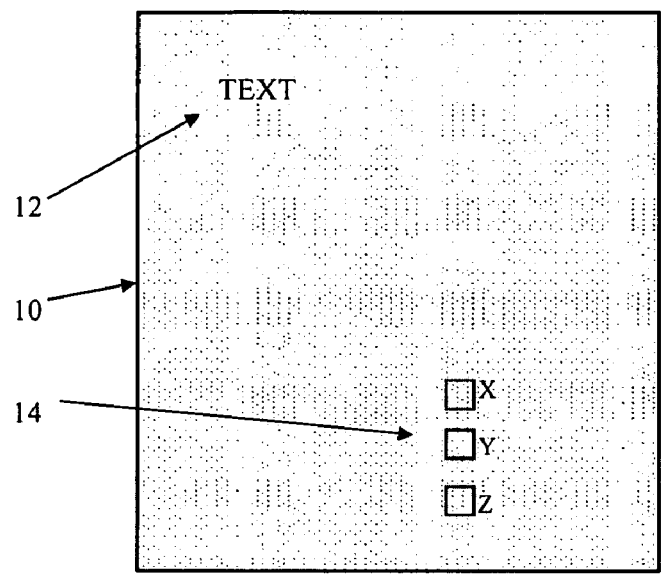
FIG. 1 shows a substrate for use with an apparatus according to the invention.

FIG. 1 shows, in simplified manner, a paper substrate 10 for use with a digital pen of a system using digital pen and paper technology.

The substrate 10 is printed with text and images 12 and spaces 14 where the user may write. The substrate also carries the non-uniform background pattern of dots. The text and images 12, etc. are provided as a watermark so that the dots of the background pattern can still be distinguished.

To use this type of system, the user has an electronic pen for writing over the substrate. This pen is both a reading and a writing device, and allows the user to write over the substrate where he/she chooses but also identifies the locations at which markings are written by reading the local background pattern. The pen stores in a memory the dot patterns at the locations of all written markings.

This provides the user with an easy interface, where the user is simply required to write over a substrate in conventional manner. The system recognises the location of marks made on the substrate, and can additionally perform character recognition for text entries.

The technology for defining the background dot pattern and for the electronic pen is already available. For this reason, only a brief discussion of the technology will now be given.

Figure 2:
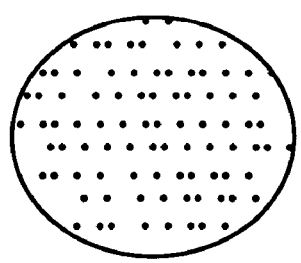
FIG. 2 shows an enlarged part of a background pattern of the substrate shown in FIG. 1.

FIG. 2 shows an enlarged part of the dot pattern. The pattern is slightly displaced from an orthogonal grid. In one example, an area of 6×6 dots gives a unique position. With each dot in one of four possible positions, this allows $4^{36}$ ($=2^{72}$) different locations to be encoded. With dot spacing of 0.3 mm, a 6×6 dot area covers less than 2 mm×2 mm, and the overlap of 6×6 dot areas enables adjacent identifiable locations to be spaced only 0.3 mm apart.

Figure 3:
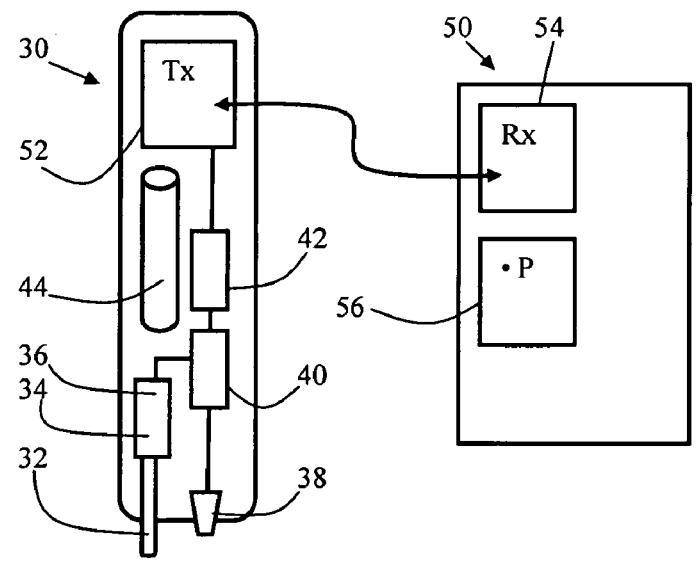
FIG. 3 shows a digital pen for use with the substrate shown in FIG. 1.

FIG. 3 shows the digital pen and a computer with which it communicates.

The pen 30 comprises a nib 32 coupled to an ink cartridge 34 and pressure sensor 36 for detecting when markings are being written. An image sensor camera 38 detects the local dot pattern. The pressure sensor and camera supply data to a processor 40. When information is being written, the pen detects this using the pressure sensor and at this time the image sensor, for example camera, detects the local dot pattern under the control of the processor 40.

The pen has a memory 42 for storing the camera information, either as recognised dot patterns or as the corresponding locations, of all written markings. The pen does not require significant processing power, but simply computes the location of the pen within the page by collecting and storing the patterns on the fly. The pen is stand alone and is powered by battery 44.

The information stored in the electronic pen can be downloaded into a central computer 50 having a receiver 54 and processor 56, with which the pen communicates using a transmitter 52.

In one known encoding scheme, the dot may be displaced by a fixed amount in any one of the four axial directions (i.e. up, down, left or right). Each dot thus has four possible positions. A sub-array of dots then encodes one location. This sub-array may have a variety of sizes, depending on the resolution required and the number of locations to be encoded.

Figure 4:
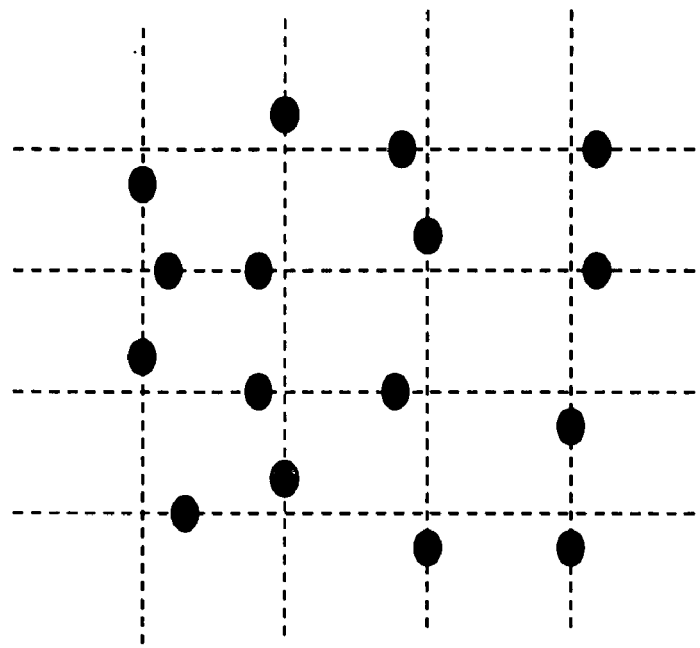
FIG. 4 is used to explain one way in which the background pattern can encode position information.

FIG. 4 shows an example of this encoding scheme, in which each dot is displaced by a fixed amount from the reference grid (in dashed lines) in one of the four axial directions. When writing with the digital pen, snapshots of the patterns are captured. Each snapshot contains enough information to calculate the exact location of the pen within the page.

This invention concerns the use of digital pen and paper technology as a handwriting input means for use in providing data into an electronic template document having a number of portions for completion by a user. It should, however, be noted that different handwriting input means may be used in accordance with the invention.

Figure 5:
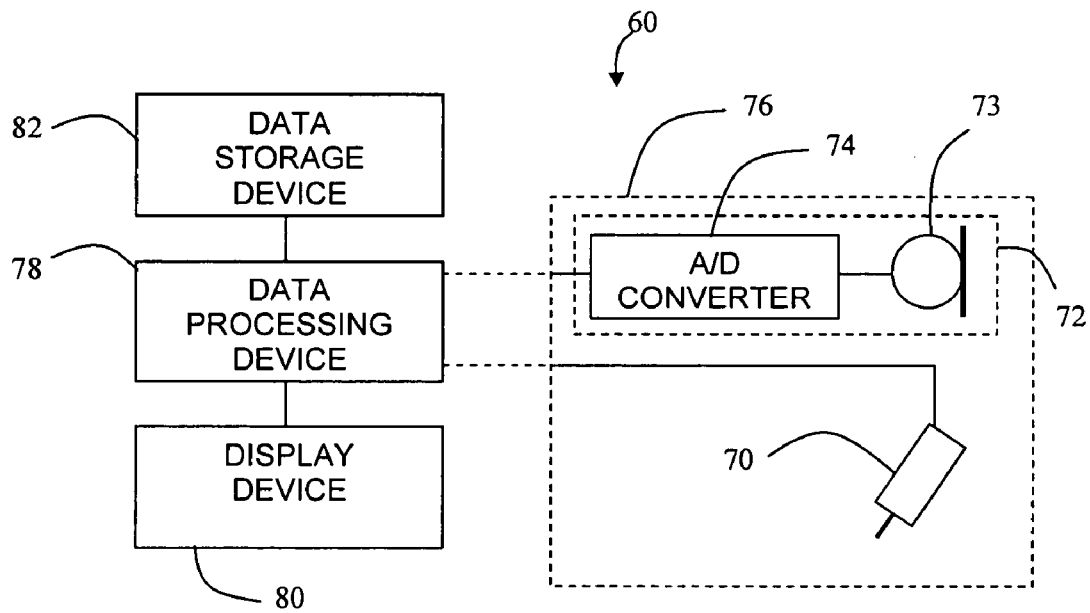
FIG. 5 shows an apparatus for providing data into a template document having a number of portions for completion by a user, according to the invention.
Figure 5:
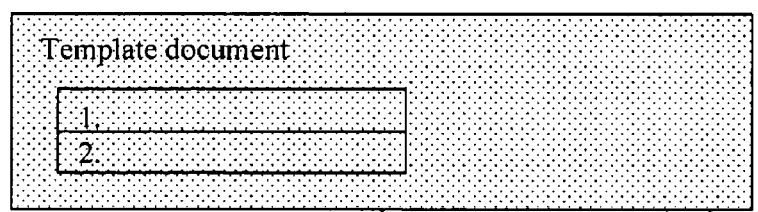

FIG. 5 shows an apparatus for providing data into an electronic template document having a number of portions for completion by a user, according to the invention.

The apparatus 60 comprises a handwriting input device 70 and a verbal input device 72. The handwriting input device 70 and the verbal input device 72 are integrated within a pen-shaped enclosure, represented by box 76, which provides a convenient and compact arrangement.

The handwriting input device 70 is essentially the same as the digital pen 30 shown in FIG. 3, but is adapted for use for use with the invention. The handwriting input device 70 is for use with substrate 86, on which is printed a physical representation of a template document.

To implement the invention, in addition to providing location information, the handwriting input device 70 provides timing information for the location information. This timing information can be considered as electronic "timestamps" for the location information decoded by the handwriting input device.

The verbal input device 72 includes a microphone 73 and an analogue to digital converter 74. The microphone 73 is located at an opposite end of the pen-shaped enclosure 76 to an end that accommodates the handwriting input device 70. In this way, the handwriting input device 70 may face a paper substrate while the microphone 73 faces a user and an interviewee.

The analogue to digital converter 74 is connected to the microphone 73 via amplification circuitry, which is not shown for clarity reasons, but is conventional and will be well known to persons skilled in the art. The analogue to digital converter 74 is provided for converting analogue voice signals from the microphone 73 into digital signals for subsequent wireless transmission.

In common with the digital pen 30 shown in FIG. 3, the handwriting input device 70 has a memory for storing location information from the handwriting input device, either as recognised dot patterns or as corresponding locations. The memory additionally stores timing information for the location information. The handwriting input device 70 does not require significant processing power, but simply computes location and timing within a substrate by collecting and storing the patterns on the fly.

The integrated handwriting input device 70 and verbal input device 72 are stand alone and powered by a battery 44.

The information from the handwriting input device 70 and a verbal passage from the analogue to digital converter 74 can be transmitted by transceiver 52 to a data processing device over a wireless link. The wireless link conforms to the well-known Bluetooth wireless standard.

The apparatus shown in FIG. 5 also includes a data processing device 78. The data processing device 78 is a personal computer having a Bluetooth adaptor for wireless communications. The data processing device 78 runs a computer program adapted to execute a method for providing data into a template document, as will be described below.

The data processing device 78 is connected to a display device 80 and a data storage device 82. The display device 80 is a conventional computer monitor. The data storage device 82 is a conventional hard disk or random access memory (RAM).

Figure 6:
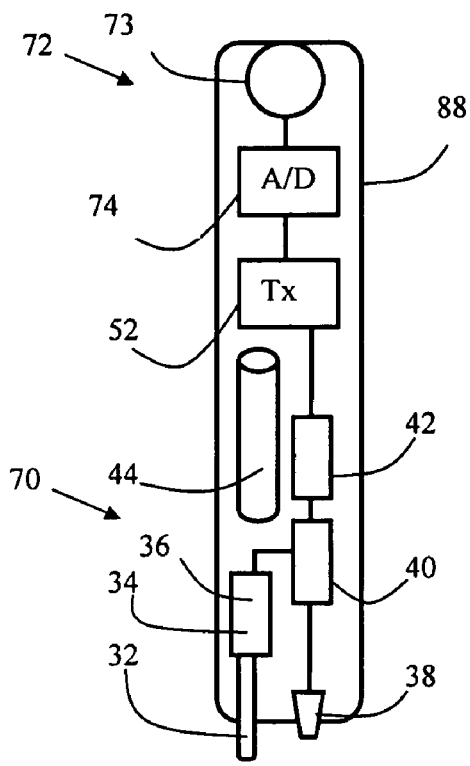
FIG. 6 shows a verbal input device and a handwriting input device of the apparatus of FIG. 5.

FIG. 6 shows a more detailed view of the integrated handwriting input device 70 and verbal input device 72. The devices 70, 72 are provided within a pen-shaped casing 88. Many of the features of FIG. 6 are common with those of FIG. 3, and like reference numerals are used where appropriate.

A method of providing data into a template document having a number of portions for completion by a user using the apparatus shown in FIGS. 5 and 6 will now be described, with reference to FIG. 7.

Figure 7:
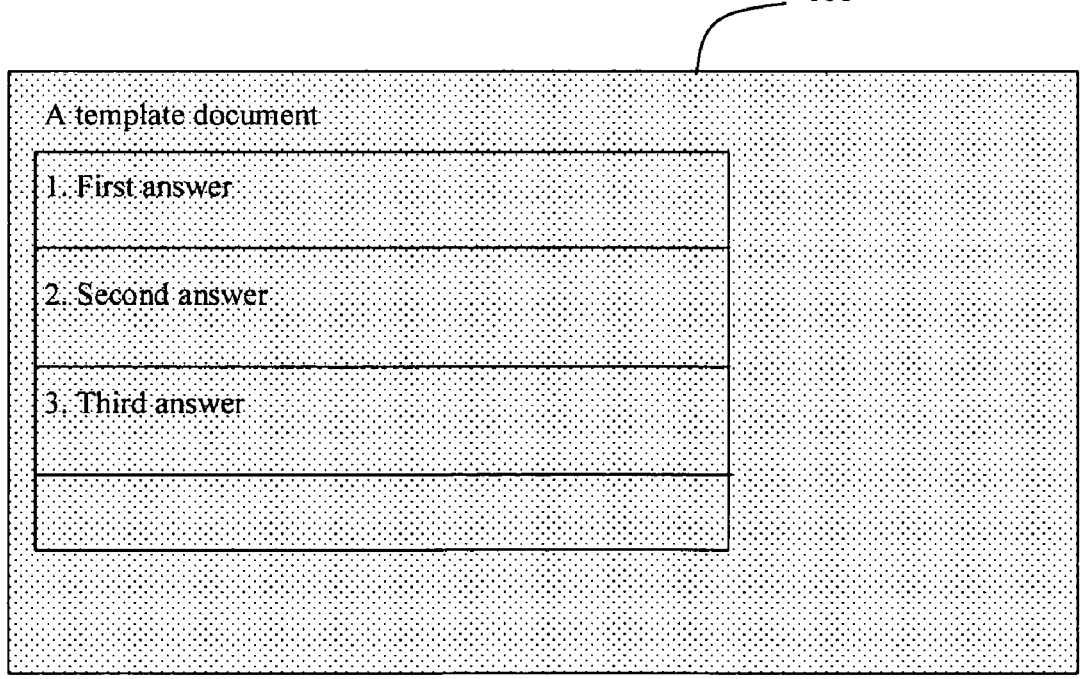
FIGS. 7 and 8 are used to explain a method for providing data into an electronic template document having a number of portions for completion by a user, according to the invention.

FIG. 7 shows a paper substrate 106 that has been printed with a physical representation of a template document. The substrate 106 also carries a background pattern, as described with reference to FIGS. 1 and 2, which encodes position information.

The method is based on an interview in which the user asks an interviewee a number of verbal questions. The interviewee responds to each question with an answer to the question. There is thus an identifiable verbal passage that can be associated with each question and answer. The interview may take place face to face, over a telephone, or over any other form of audio connection.

The entire interview is detected and recorded using the verbal input device 72. In particular, the microphone 73 detects the voices of the user and the interviewee. The analogue voice signals from the microphone 73 are converted into digital signals by the analogue to digital converter 74. The digital signals from the analogue to digital converter 74 are then transmitted to the data processing device 78 over a wireless connection established by the Bluetooth transceiver 52.

The data processing device 78 stores the digital signals defining the verbal passages, and timing information for the verbal passages, in the data storage device 82.

The user also manually records handwritten information on the substrate 106 using the handwriting input device 70 in response to each of the interviewee's answers. The information for each answer is handwritten by the user in a specific portion of the template document printed on the paper substrate 106. The information may comprise handwritten text, or graphics such as crosses inserted in pre-printed boxes.

As well as being recorded as physical marks on the substrate 106, the handwritten information is also decoded by the handwriting input device 70 and stored in electronic form in its memory 42, before being transmitted to the data processing device 78 over the wireless connection.

The data processing device 78 stores the handwritten information, together with location and timing information for the handwritten information, in the data storage device 82.

Next, the data processing device 78 operates under the control of a computer program to populate an electronic version of the template document with data. The electronic version of the template document is populated with data based on both the verbal passages and the handwritten information stored in the data storage device 82. By using both verbal and handwritten information, the accuracy of the data in the electronic version of the template document is improved as compared to use of a single type of input.

The handwritten information and the verbal passage for each specific portion of the template document are not synchronised. In particular, the handwritten information is typically recorded by the user some time after the interviewee has spoken their answer. There is thus a time lag between an answer provided by an interviewee and the written information recorded by the user.

To accommodate this lack of synchronisation, the verbal passages relating to a number of questions and answers are separated, and each one of the verbal passages is then associated with the written information for a specific portion of the template document. The separation and association of verbal passages and written information is shown in FIG. 8.

Figure 8:
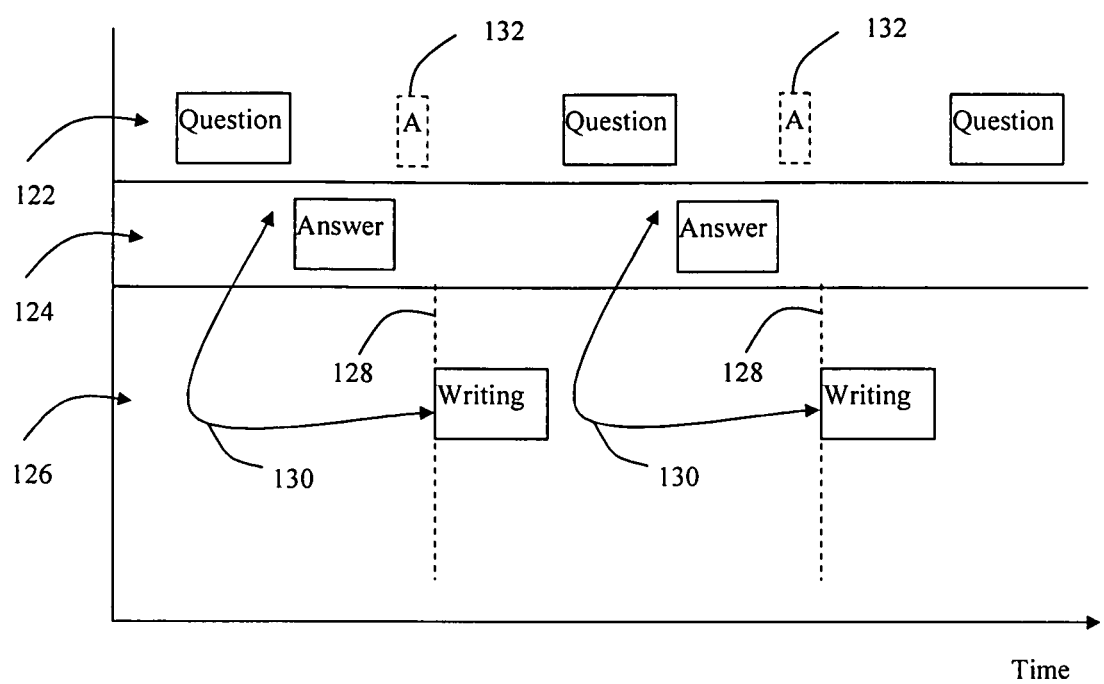

FIG. 8 is a timing chart. The first row 122 in the chart represents verbal questions being asked by the user. The second row 124 in the chart represents verbal answers provided by the interviewee. The third row 126 in the chart represents written information being recorded in specific portions of the template document recorded on the substrate 106 by the user. The dashed lines 128 in the chart represent time boundaries between successive verbal passages. The double ended arrows 130 represent the association of verbal passages with written information. As shown, it is assumed that the handwritten text must follow the associated verbal passage, and the user will become accustomed to completing the template document with this in mind.

As can be seen from the Figure, the verbal passages are separated based on the timing of an initial handwritten marking made by the user in each of the portions of the template document printed on the paper substrate. Thus, the timing of an initial marking by the user in a specific portion of the template document provides the boundary between two successive verbal passages.

A verbal passage, once separated, is then associated with handwritten information for a specific portion of the template document that immediately follows the verbal passage, as shown in FIG. 8.

The handwritten information associated with a specific portion of the template documents is identified as being relevant to that specific portion using the location information for the handwritten information on the substrate 106, the data processing device 78 mapping the location information to the specific portion of the template document.

Once a verbal passage has been associated with the written information for a specific portion of the template document, the data processing device 78 identifies a relevant part of the verbal passage, i.e. a part that contains the interviewee's answer rather than the user's question, and recognises that part of the verbal passage by identifying words or phrases using voice recognition algorithms. It should be noted that, in practice, the entire verbal passage is first recognised in order to identify the relevant part.

A number of techniques may be selectively used in combination by the data processing device 78 to identify the relevant part of the verbal passage. The data processing device 78 uses the most appropriate techniques for the circumstances.

Firstly, the relevant part of the verbal passage may be determined based on a lead time for the user, the lead time being an average time between an answer provided by an interviewee in the verbal passage and an initial timing of the handwritten information for the specific portion of the template document. The lead time is deducted from the end of the verbal passage to arrive at the relevant part.

Secondly, the relevant part of the verbal passage may be determined by disregarding a part of the verbal passage that represents the question asked by the user. This technique is particularly appropriate if the text of the question is fixed, in which case the data processing device 78 can refer to a stored copy of the text. The data processing device 78 may alternatively simply store key works for the question.

Thirdly, the relevant part of the verbal passage may be determined based on a voice profile of the user. This technique is particularly appropriate if the data processing device 78 can be trained to disregard the user's voice, for example by storing a frequency profile of the user's voice.

The relevant part of the verbal passage may also be determined based on repetition of recognised words or phrases. For example, the user may deliberately repeat the user's answer, the data processing device 78 being able to recognise this repetition. An example of the timing of a user repeating an answer is shown in FIG. 8 as a box 132. Other patterns present in the verbal passage may be used to recognise the relevant part, depending on the particular scenario.

Words or sounds may also inserted in the verbal passage by the user to act as flags. The data processing device may then use these flags to identify the relevant part of the verbal passage.

Once the relevant part of a verbal passage has been identified and recognised, the handwritten information associated with the verbal passage is recognised by the data processing device 78, using handwriting recognition algorithms. The handwritten information may comprise text or alternatively it may comprise graphics, including markings provided in check boxes.

The voice and handwriting recognition algorithms used by the data processing device 78 provide several potential matches for the relevant part of the verbal passage and the handwritten information, together with a statistical confidence score for each match. The confidence score for a particular match provides an indication of the likelihood that the match is the correct match. The potential matches, together with their confidence scores, are stored in the data storage device 82.

The various matches, together with the confidence scores, are used by the data processing device 78 to determine the correct data to be entered into the specific portion of the electronic version of the template document. This data is then associated with the specific portion of the electronic version of the template document.

A number of techniques may be used by the data processing device 78 to determine the correct data to be entered. For example, a thresholding process may be used, in which threshold values are preset by the user. Matches having confidence scores below the preset threshold values are then ignored (unless all of the matches have a confidence score below the threshold).

Adaptive threshold values may also be used, and different threshold values may be used for voice and written type matches. Different threshold values may also be set for different specific portions of the template document so as to reflect a varying importance of the data to be provided therein.

If after the applying the threshold values, only one match remains, either from the verbal passage or the handwritten information, then that remaining match is determined as the data to be entered into the electronic version of the template document.

For example, if check boxes for both "male" and "female" have been crossed by the user, then the handwritten information match for a "gender" portion of the template document may be that associated with the check box containing more ink. However, the match may have a low confidence score, which is below a preset threshold value. In this case, the data processing device determines the verbal passage match as the data to be provided into the electronic version of the template document, provided that the match has a confidence value above the threshold value.

If both the verbal passage and the written information provide several matches having confidence scores above a threshold value, the data to be entered into the electronic version of the template document may simply be determined as the match with the highest confidence score. Alternatively, a tie-breaking algorithm may be used to determine which of the matches is correct.

For example, where the handwriting recognition algorithm returns three matches for the written information, "30", "33" and "35", which are visually similar but not phonetically similar, a match provided by the voice recognition algorithm may be used to determine which one of the written information matches is the correct one.

The tie-breaking algorithm may also modify the confidence scores of the various matches based on the characteristics of the matches themselves. For example, a degree of similarity between the matches may be calculated based on a proportion of common characters in the recognised words. This degree of similarity may then be used to reduce confidence scores for matches where the degree of similarity is high.

As well as associating correct data with a specific portion of the electronic version of the template document, the confidence score of that data may also be associated.

The data processing device 78 repeats the above described process for each specific portion of the template document until the electronic version of the template document has been fully populated based on the inputs available.

A specific example of the invention has been described above. Various modifications within the scope of the claims will be apparent to persons skilled in the art.

For example, a handwriting input device integrated with a verbal input device is provided in the example described above. However, these may be separate components of the apparatus. Similarly, whereas a data processing device is described above as being a separate component of the apparatus, it may alternatively be integrated with other components of the apparatus.

Also, the handwriting input device of the above described example is similar to a conventional digital pen as employed in digital pen and paper technology. However, other forms of handwriting input device are suitable, including tablet type devices.

In the example above, the verbal input device comprises an audio voice recorder. However, the verbal input device may, for example, be a video camera, the verbal passages then being recognised from facial movements of the interviewee and/or the user. The video camera may be in addition to or instead of a voice recorder.

The invention is applicable to a large number of scenarios in which an interview takes place, such as data entry in call centres. However, the invention is also applicable to other situations, such as where only a user speaks.

The invention claimed is:

1. An apparatus for providing data into a template document having a number of portions for completion by a user, the apparatus comprising:

a verbal input device arranged to receive and record a verbal passage, the verbal passage including information for a specific one of the portions of the template document;

a handwriting input device arranged to both detect handwritten information corresponding to the verbal passage and identify the specific portion of the template document; and a data processing and storage device arranged to:

associate the verbal passage with the handwritten information based on the timings of the verbal passage and the handwritten information;

determine from the verbal passage and the handwritten information the data to be provided into the specific portion of the template document; and associate the data with the specific portion of the template document.

2. The apparatus of claim 1, wherein the data processing and storage device is arranged to determine the timing of the handwritten information using an output of the handwriting input device.

3. The apparatus of claim 1, wherein the handwriting input device comprises a reading device, the reading device being for use with a substrate carrying a background pattern, local portions of the background pattern uniquely encoding respective locations of the substrate, the reading device being arranged to read a local portion of the background pattern and decode a respective location of the substrate.

4. The apparatus of claim 1, wherein the verbal input device is a video input device.

5. The apparatus of claim 1, wherein the verbal input device is a voice input device.

6. The apparatus of claim 5, wherein the voice input device and the handwriting input device are integrated within a single casing.

7. A computer program product for providing data into a template document having a number of portions for completion by a user when said program is run on a computer, the computer program product comprising:

a computer readable medium having computer usable program code embodied therewith, the computer usable program code configured to perform the following steps;

receiving and recording a verbal passage, the verbal passage including information for a specific one of the portions of the template document;

detecting handwritten information corresponding to the verbal passage and identifying the specific portion of the template document;

associating the verbal passage with the handwritten information based on the timings of the verbal passage and the handwritten information;

determining from the verbal passage and the handwritten information the data to be provided into the specific portion of the template document; and associating the data with the specific portion of the template document.

8. The computer program product of claim 7, wherein the step of associating the verbal passage with the handwritten information comprises:

separating a verbal recording into a plurality of verbal passages; and associating one of the verbal passages with the handwritten information.

9. The computer program product of claim 8, wherein start and end times for each verbal passage are based on the timings of the handwritten information for two consecutive portions of the template document.

10. The computer program product of claim 7, wherein the step of determining the data to be provided into the specific portion of the template document comprises:

determining a part of the verbal passage that contains the information for the specific portion of the template document and recognising that part of the verbal passage by identifying words or phrases;

recognising the handwritten information corresponding to the verbal passage by recognising text or graphics; and determining the data to be provided into the specific portion of the template document based on the recognised part of the verbal passage and the recognised handwritten information.

11. The computer program product of claim 10, wherein the part of the verbal passage that contains the information for the specific portion of the template document is determined based on a lead time for the user, the lead time being an average time between an answer provided by an interviewee in the spoken passage and an initial timing of the handwritten information for the specific portion of the template document.

12. The computer program product of claim 10, wherein the part of the verbal passage that contains the information for the specific portion of the template document is determined by disregarding a part of the verbal passage that represents a question asked by the user, the text of the question being predetermined.

13. The computer program product of claim 10, wherein the part of the verbal passage that contains the information for the specific portion of the template document is determined based on a voice profile of the user, the voice profile being predetermined.

14. The computer program product of claim 10, wherein the part of the verbal passage that contains the information for the specific portion of the template document is determined based on repetition of recognised words or phrases.

15. The computer program product of claim 10, wherein the step of determining the data to be provided into the specific portion of the template document comprises determining confidence scores for the recognised part of the verbal passage and the recognised handwritten information.

16. A computer-executed method for providing data into a template document having a number of portions for completion by a user, the method comprising:

providing a verbal passage, the verbal passage including information for a specific one of the portions of the template document; and providing handwritten information corresponding to the verbal passage, the handwritten information being positioned to identify the specific portion of the template document, wherein the verbal passage and the handwritten information are digitized and supplied to a computer system including a data processor and a data storage device, said processor:

associating the digitized verbal passage with the digitized handwritten information based on the timings of the verbal passage and the handwritten information;

determining from the digitized verbal passage and the digitized handwritten information the data to be provided into the specific portion of the template document; and associating the data with the specific portion of the template document.

* * * * *